US006829883B2

(12) United States Patent
Sathianathan et al.

(10) Patent No.: US 6,829,883 B2
(45) Date of Patent: Dec. 14, 2004

(54) TURBO FAN GAS TURBINE ENGINE HAVING A ROTOR CONTAINMENT ASSEMBLY

(75) Inventors: Sivasubramaniam K Sathianathan, Burton on Trent (GB); Peter E Farrington, Derby (GB); Ian G Martindale, Derby (GB); Caroline McLachlan, Derby (GB); Stephen J Booth, Derby (GB); Duncan Auterson, Derby (GB); David S Yazdani, Derby (GB)

(73) Assignee: Rolls-Royce plc, London (GB)

( * ) Notice: Subject to any disclaimer, the term of this patent is extended or adjusted under 35 U.S.C. 154(b) by 31 days.

(21) Appl. No.: 10/190,552

(22) Filed: Jul. 9, 2002

(65) Prior Publication Data

US 2003/0014964 A1 Jan. 23, 2003

(30) Foreign Application Priority Data

Jul. 19, 2001 (GB) .............................................. 0117550

(51) Int. Cl.$^7$ ................................................. F02K 3/02
(52) U.S. Cl. ..................... 60/226.1; 60/223; 60/39.891; 415/9; 415/200; 403/150; 403/153
(58) Field of Search ................................ 60/223, 226.1, 60/39.891; 415/9, 173.4, 200; 403/150, 153, 154, 157, 161, 408.1; 29/525.01; 14/14; 164/108; 238/151

(56) References Cited

U.S. PATENT DOCUMENTS

| | | | | |
|---|---|---|---|---|
| 4,417,848 A | * | 11/1983 | Dembeck ................. | 415/121.2 |
| 4,648,795 A | * | 3/1987 | Lardellier .................... | 415/196 |
| 4,718,818 A | * | 1/1988 | Premont ......................... | 415/9 |
| 4,929,113 A | * | 5/1990 | Sheu ........................... | 403/157 |
| 5,336,044 A | * | 8/1994 | Forrester ....................... | 415/9 |
| 6,009,701 A | * | 1/2000 | Freeman et al. ............... | 60/223 |
| 6,098,399 A | * | 8/2000 | Richards et al. .............. | 60/223 |
| 6,113,347 A | * | 9/2000 | Forrester ....................... | 415/9 |
| 6,179,551 B1 | * | 1/2001 | Sathianathan et al. ......... | 415/9 |
| 6,206,631 B1 | * | 3/2001 | Schilling ....................... | 415/9 |
| 6,290,455 B1 | * | 9/2001 | Hemmelgarn et al. ......... | 415/9 |
| 6,371,721 B1 | * | 4/2002 | Sathianathan et al. ......... | 415/9 |
| 6,382,905 B1 | * | 5/2002 | Czachor et al. ............... | 415/9 |
| 6,543,991 B2 | * | 4/2003 | Sathianathan et al. ......... | 415/9 |
| 6,575,694 B1 | * | 6/2003 | Thompson et al. ............ | 415/9 |
| 2001/0028840 A1 | * | 10/2001 | Booth .......................... | 10/190 |
| 2002/0164244 A1 | * | 11/2002 | Sathianathan et al. ......... | 415/9 |

FOREIGN PATENT DOCUMENTS

GB    1 033 366 SP    6/1966

* cited by examiner

Primary Examiner—Justine R. Yu
Assistant Examiner—William H. Rodriguez
(74) Attorney, Agent, or Firm—W. Warren Taltavull; Manelli, Denison & Selter PLLC (57) ABSTRACT

A joint assembly for limiting an extension of the joint in the direction of a load path derived from an impact comprising a first member having a portion and a second member having a portion, the portions overlapping one another and arranged generally parallel to one another and secured together via securing means disposed through corresponding holes defined therein. One of the overlapping portions further defines, sequentially in the direction of extension, a shear neck, a pocket and a catcher portion. In the event of a worst-case impact load the securing means shears through the shear neck and the pocket and is arrested by the catcher portion, thereby the extension of the joint assembly is limited and the joint assembly remains integral.

22 Claims, 5 Drawing Sheets

Fig.1.

PRIOR ART

Fig.2.

PRIOR ART

Fig.3.

PRIOR ART

TURBO FAN GAS TURBINE ENGINE HAVING A ROTOR CONTAINMENT ASSEMBLY

FIELD OF THE INVENTION

The present invention relates to a joint arrangement for gas turbine engine casings, particularly gas turbine engine fan casings and more particularly to an improved casing joint arrangement for use within or forming a part of the gas turbine engine blade containment assembly.

BACKGROUND OF THE INVENTION

Turbofan gas turbine engines for powering aircraft conventionally comprise a core engine, which drives a fan. The fan comprises a number of radially extending fan blades mounted on a fan rotor which is enclosed by a generally cylindrical, or frustoconical, fan casing. The core engine comprises one or more turbines, each one of which comprises a number of radially extending turbine blades enclosed by a cylindrical, or frustoconical, casing.

There is a remote possibility with such engines that part, or all, of a fan blade, or a turbine blade, could become detached from the remainder of the fan or turbine. In the case of a fan blade becoming detached this may occur as the result of, for example, the turbofan gas turbine engine ingesting a bird or other foreign object.

The use of containment rings for turbofan gas turbine engine casings is well known. It is known to provide generally cylindrical, or frustoconical, relatively thick metallic containment rings. It is also known to provide generally cylindrical, or frustoconical, locally thickened, isogrid, metallic containment rings. Furthermore it is known to provide strong fibrous material wound around relatively thin metallic casings or around the above mentioned containment casings. In the event that a blade becomes detached it passes through the casing and is contained by the fibrous material.

However, in the event that a blade becomes detached, the blade strikes the metal casing and a significant load is imparted from the main impact region of the metal casing to a flanged interface with an intake casing or rear fan casing.

It is normal practice to transfer the impact loads along the metal casing to the flanged interface joint with the intake or rear fan casing. The flanged interface is bolted together with an array of circumferentially spaced bolts. Under impact by a released fan blade, the flanged joint between the metal casing and the intake or rear fan casing has a tendency to open thus permitting an unwanted and substantial degree of movement of the joint. To counter this the flanged joint is a substantial structure and is therefore of considerable weight. Furthermore it is a requirement for the bolts to resist the considerable shear force between casings and therefore the bolts are also of substantial number, size and weight. Nevertheless it is known that the integrity of the bolted flange joint can be lost and debris from a blade off event pass through the flanged joint.

SUMMARY OF THE INVENTION

Accordingly the present invention seeks to provide a novel gas turbine engine casing joint which is of less weight, deforms less, and absorbs more energy and transfers less impact load to the intake or rear fan casing than has previously been the case.

Accordingly the present invention provides a joint assembly for limiting an extension of the joint in the direction of a load path derived from an impact comprising: a first member and a second member each having overlapping portions arranged generally parallel to one another and secured together via securing means disposed through corresponding holes defined therein; wherein one of the overlapping portions further defines, sequentially in the direction of extension, a shear neck, a pocket and a catcher portion; so that in the event of a worst case impact load the securing means shears through the shear neck and the pocket and is arrested by the catcher portion, thereby the extension of the joint assembly may be limited and the joint assembly remains integral.

Preferably, one overlapping portion is configured as a tongue portion and the other overlapping portion is configured as a groove portion, the tongue portion engages the groove portion in a conventional manner.

Preferably, the pocket comprises a membrane but alternatively the pocket comprises an aperture.

Alternatively, the pocket comprises at least one further shear neck.

Preferably, the membrane is of a constant thickness, but alternatively the membrane may be of variable thickness and the membrane increases in thickness between the shear neck and the catcher portion.

Alternatively pocket is substantially semi-circular in configuration about the hole and the pocket comprises at least one radially aligned spoke.

Alternatively, an energy absorbing insert is disposed to the pocket.

Preferably, a sealing means is provides to substantially prevent fluid flow through the joint.

Alternatively, contact surfaces comprise a means for enhancing friction.

Alternatively, the tongue portion comprises a discrete tongue portion and the groove portion comprises a groove and a radial slot, the slot so disposed that it extends the groove locally and axially rearward, the tongue portion arranged to engage the groove and the discrete tongue portion arranged to engage the radial slot.

Preferably the tongue portion and groove portion of the foregoing paragraph comprise a plurality of corresponding discrete tongue portions and slots.

Preferably, the tongue portion and the groove portion are annular.

Preferably, a gas turbine engine rotor blade fan casing assembly comprises a joint assembly as claimed in any of the above paragraphs.

Preferably, the fan casing assembly comprises a metal casing and a rear fan casing, the casing assembly comprising the first member and the rear fan casing comprising the second member.

Alternatively, the metal casing is any one of a group comprising a fan containment casing and a core engine casing.

Preferably, the impact is derived from a released rotor blade striking the containment casing during operation of the engine.

Preferably, a plurality of joint assemblies are circumferentially disposed about the fan casing assembly.

Preferably, at least one additional pocket is disposed between each joint assembly.

BRIEF DESCRIPTION OF THE DRAWINGS

The present invention will be more fully described by way of example with reference to the accompanying drawings in which.

DETAILED DESCRIPTION OF THE INVENTION

Figure 1:
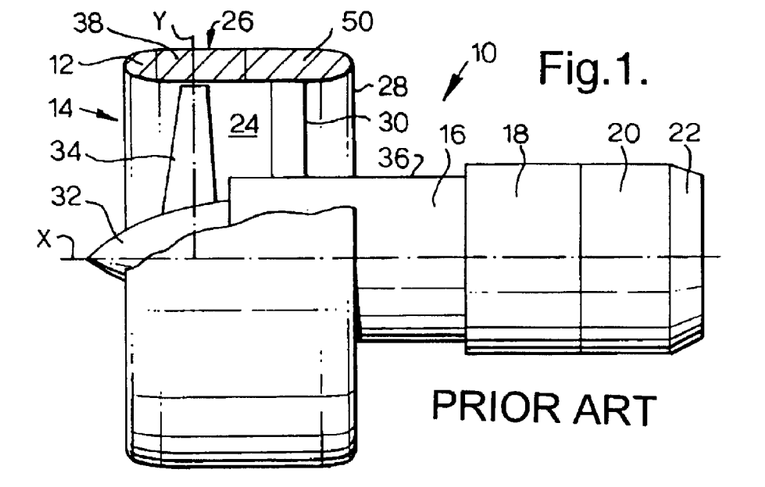
FIG. 1 is a partially cut away view of a gas turbine engine comprising a fan blade containment assembly.

With reference to FIG. 1, a turbofan gas turbine engine 10 comprises in flow series an intake assembly 12, a fan section 14, a compressor section 16, a combustor section 18, a turbine section 20 and an exhaust 22. The turbine section 20 comprises one or more turbines arranged to drive one or more compressors in the compressor section 16 via shafts (not shown). The turbine section 20 also comprises a turbine to drive the fan section 14 via a shaft (not shown). The fan section 14 comprises a fan duct 24 defined partially by a fan casing assembly 26. The fan duct 24 has an outlet 28 at its axially downstream end. The fan casing assembly 26 is secured to a core engine casing 36 by a plurality of radially extending fan outlet guide vanes 30. The fan casing assembly 26 surrounds a fan rotor 32, which carries a plurality of circumferentially spaced radially extending fan blades 34. The fan rotor 32 and fan blades 34 rotate about an axis X of the gas turbine engine 10, substantially in a plane Y perpendicular to the axis X. The fan casing assembly 26 also comprises a fan blade containment assembly 38 and a rear fan casing 50, which are arranged substantially in the plane of the fan blades 34.

Figure 2:
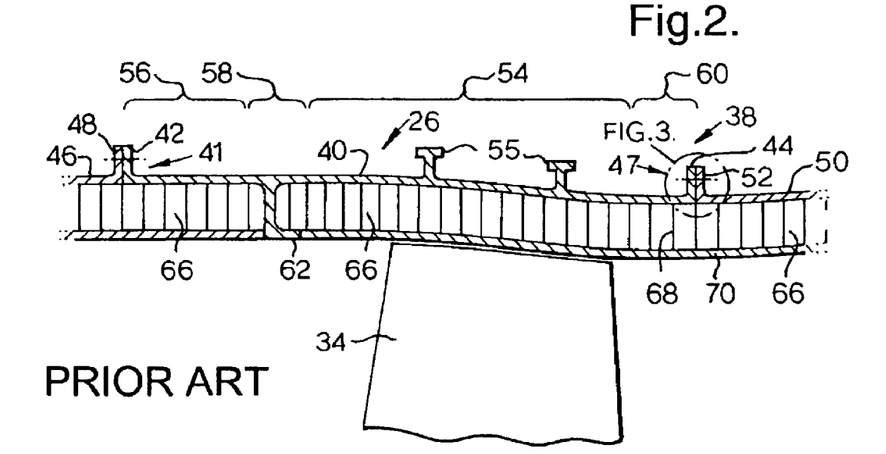
FIG. 2 is an enlarged cross-sectional view of a prior art fan blade containment assembly as generally shown in FIG. 1.

The fan casing assembly 26 and fan blade containment assembly 38 are shown more clearly in FIG. 2. The fan blade containment assembly 38 comprises a metal frustoconical casing 40, although it could be cylindrical if so desired. The metal casing 40 is connected to the fan blade containment assembly 38 at a flanged joint 41 comprising an upstream flange 42 bolted to a flange 48 of an intake casing 46 of the intake assembly 12. A downstream flanged joint 47 connects a flange 44 of the fan blade containment assembly 38 to a flange 52 on a rear fan casing 50 of the fan casing assembly 26.

The metal casing 40 provides the basic fan blade containment and provides a connection between the intake casing 46 and the rear fan casing 50.

The metal casing 40 comprises an upstream portion 56, a transition portion 58, a main blade containment portion 54 and a downstream portion 60. The upstream portion 56 comprises the flange 42 and the downstream portion 60 comprises the flange 52. The flange 42 on the upstream portion 56 of the metal casing 40 is fastened to the flange 48 on the intake casing 46 by a plurality of equally circumferentially spaced, axially extending, bolts 49 and associated nuts 51.

The upstream portion 56 is upstream of the plane Y of the fan blades 34 and provides debris protection for the fan blade containment assembly 38. The main blade containment portion 54 is substantially in the plane Y containing the fan blades 34 and comprises a radially inwardly and axially downstream extending flange, or hook, 62 at its upstream end. The main blade containment portion 54 may also comprise one, or more, integral T-section ribs 55, which extend radially outwardly from the main blade containment portion 54. The T section ribs 55 extend circumferentially around the main blade containment portion 54 to stiffen the metal casing 40 to improve the fan blade 34 containment properties. The transition portion 58 connects the main blade containment portion 54 and the upstream portion 56 to transmit loads from the main blade containment portion 54 to the upstream flange 42 on the upstream portion 56. The rear fan casing 50 is downstream of the plane Y of the fan blades 34, and provides protection for where a root (not shown) of a fan blade 34 impacts the fan blade containment assembly 38 during a fan blade off event.

It may be desirable in some circumstances to provide a number of continuous layers of a strong fibrous material (not shown) wound around and radially outward the metal casing 40 (as known in the art) to further increase the energy absorbing capability of the fan blade containment assembly 38. The strong fibrous material may for example be woven aromatic polyamide fibres known as KEVLAR (KEVLAR is a registered trademark of Dupont Ltd). There may also be a number of layers of discrete pieces of flexible material woven from KEVLAR between the metal casing 40 and the continuous layers of fibrous material.

Figure 3:
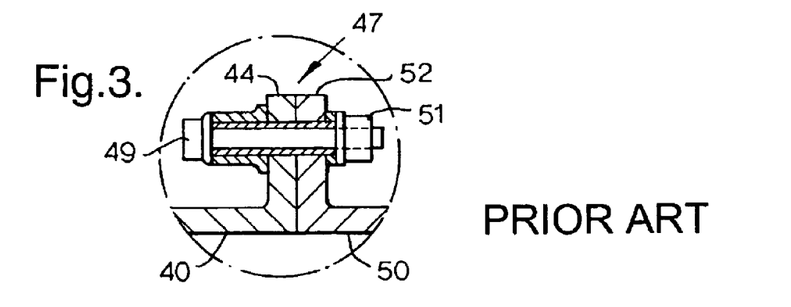
FIG. 3 is a further enlarged cross-sectional view through a portion of the prior art fan blade containment assembly shown in FIG. 2.

An acoustic lining 66 may be provided on the inner surface of the metal casing 40. The acoustic lining 66 comprises a honeycomb 68 and a perforate sheet 70. The honeycomb 68 and perforate sheet 70 are quite conventional.

In operation of the gas turbine engine 10, in the event that a fan blade 34, or a portion of a fan blade 34, becomes detached it encounters the metal casing 40. The main blade containment portion 54 of the metal casing 40 is impacted by the fan blade 34, or portion of the fan blade 34, and effectively removes energy from the fan blade 34, or portion of the fan blade 34.

The impact loads are transferred from the main blade impact portion 54 of the metal casing 40 to the flange 52 on the upstream portion 56 of the metal casing 40 through the transition portion 58 of the metal casing 40. The transition portion 58 is arranged to flex during the impact, due to its smoothly curved shape, to reduce the impact loads transmitted to the upstream flange 48. The impact loads are also transferred through the downstream portion 40 to the bolted flange 44, 52 and to the rear fan casing 50 of the fan casing assembly 26. It is important for the flanged joint 41 and particularly 47 to remain integral so that impact debris does not escape the fan casing assembly 26.

During impact the containment casing 38 is displaced radially outwardly and which intrinsically generates a great tensile force and a high bending moment across the flanged joint 47. The bolts 49 must also transfer high shear forces, particularly those in the region adjacent the blade 34 impact position. Thus the flanged joint 47 is a substantial structure, comprising a large number of bolts 49, and subsequently is heavy and bulky. It is therefore desirous to provide a lighter joint which may also absorb more impact energy.

Figure 4:
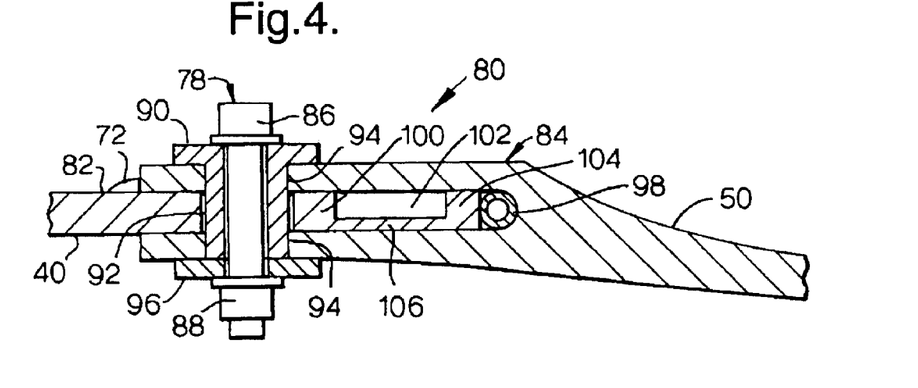
FIG. 4 is an enlarged cross-sectional view of a portion of the fan blade containment assembly in accordance with the present invention and as shown in FIG. 2.

Referring now to FIG. 4, a tongue and groove joint 80, which is an exemplary embodiment of the present invention, is intended to replace the flanged joint 47 (and 41). In this embodiment a first member is defined by the metal casing 40 and a second member is defined by the rear fan casing 50. The first and second members 40, 50 have overlapping portions 82, 84 and in this example the overlapping portions 82, 84 comprise a tongue portion 82 and a groove portion 84 which are arranged in conventional fashion and are generally annular in configuration. The tongue portion 82 and groove portion 84 are secured together by a hollow pin 90, inserted through corresponding radially aligned holes 92 and 94 defined therein respectively. A bolt 86 extends through the hollow pin 90 and co-operates with a nut 88 and washer 96 in conventional fashion to secure the pin 90 together the tongue and groove portions 82, 84.

A generally circumferential seal 98 is provided within the groove 84 to substantially prevent fluidic leakage therethrough. In this embodiment the seal 98 is of an 'O'-ring type configuration, however, any type of suitable seal may be used without departing from the present invention.

The tongue portion 82 further defines, sequentially and in general alignment with the direction of extension of the joint 80, a pocket 102, a shear neck 100 and a catcher portion 104. Typically the pocket 102 is machined by any conventional method to leave a membrane 106. Although the pocket 102 is shown radially outward of the membrane 106 the present invention is similarly operable if the pocket 102 were machined radially inward of the membrane 106.

During normal operation of the engine 10 it is intended that the shear neck 100 is sufficiently robust to carry normal operational loads. However, in the unlikely event of a fan blade 34 or part of a fan blade 34 being released and striking the containment casing 38, the shear neck 100 is intended to fail against the pin 86. After the pin 102 shears through the shear neck 100, and where the tongue portion 82 continues to be forced generally axially away from the groove portion 84, the pin 86 also shears through the membrane 106. The catcher portion 104 is of sufficient sectional thickness to prevent further relative movement of the tongue portion 82 away from the groove portion 84. The action of the tongue portion 82 pulling through the shear neck 100 and the membrane 106 is indicative of the worst case impact loading condition possible and lesser impacts may result in a partial shear of the shear neck 100 and or the membrane 106.

This novel arrangement of the joint 80 has two important functions. Firstly, as the shear neck 100 and membrane 106 are plastically deformed and sheared through, a high degree of energy is absorbed. Pure elastic impact resistance would require a more substantial structure as the total strength of the material is only utilised up to its elastic strain limit rather than the full plastic strain limit of the material. Secondly, it is desirable for the containment casing 38 to be able to fully deform subject to the blade 34 impact whilst the joint 80 remains integral. When struck by a released blade 34 the containment casing 38 is designed to deflect radially outward to absorb the impact energy of the released blade 34, intrinsically drawing the adjacent rear fan casing 50 axially forward and radially outward. The deflection of the containment casing 38, during impact, can only be achieved if relative axial movement is possible between the metal casing 40 and the rear fan casing 50 of the fan casing assembly 26. The arrangement of the joint 80 and in particular the axial length of the membrane 106 is configured to provide sufficient axial extension during a significant blade 34 impact event. Thus incorporation of this joint 80 allows the containment casing 38 to be designed to be flexible and lighter than existing designs, without compromising the integrity of the joint 80.

For the pin 90 to shear through the material of the shear neck 100 a large initial load is required followed by a lower load require to maintain shearing thereafter. When the pin 90 has sheared through the shear neck 100 and membrane 106, it is intended that enough energy has dissipated from the impact that the pin 90 is prevented from further shearing when it abuts the catcher portion 104. The catcher portion 104 is able to arrest further shearing as it represents a step change in the required shear load. Furthermore, the impact energy has been significantly reduced by the shearing process and the effect of the containment casing 38 and the ability of the joint 80 to undergo the design axial extension (i.e. the membrane 106 axial length).

The axial length of the pocket 102 and thickness of the membrane 106 will depend on a number of factors including the physical properties of material used for the tongue 82, the size of the pin 94, the number of pins 94 and corresponding pockets 102, and most importantly the flexural characteristics of the containment casing 38 during blade 34 impact and which governs the amount of load transferred through the joint 80. It should be noted that for each different aero-engine application the length of the pocket 102 and membrane thickness 106 will be different and therefore should be designed accordingly.

A location feature 72 is disposed to the tongue portion 82 to provide a positive location for the depth the tongue portion 82 enters the groove portion 84. In this embodiment the location feature 72 shown is one of a circumferential array of location features 72, although alternatively the location feature 72 may be annular or substantially annular.

Figure 5:
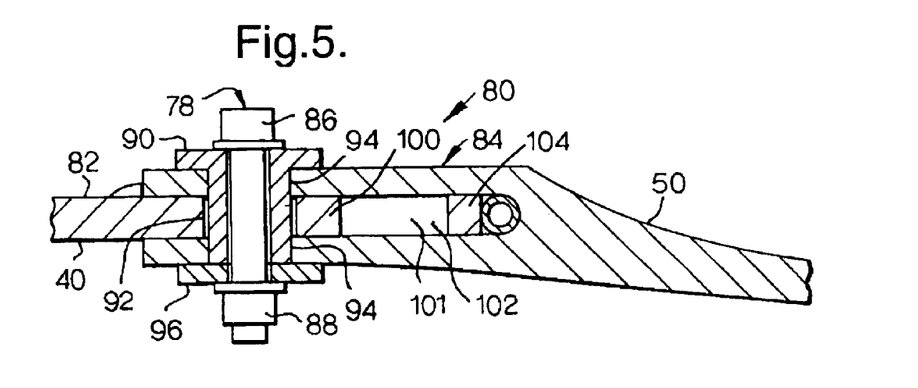
FIG. 5 is an enlarged cross-sectional view of an alternative arrangement of a portion of the fan blade containment assembly in accordance with the present invention and as shown in FIG. 2.

Referring now to FIG. 5, where like parts have the same reference numerals as shown in FIG. 4, the membrane 106 of FIG. 4 is removed and the pocket 102 is extended to form an aperture 101. Whereas the former embodiment provides a degree of resistance to the pin 90 shearing through the membrane 106 between the shear neck 100 and the catcher portion 104, this embodiment relies on the catcher portion 104 preventing the pin 90 shearing further through the rear fan casing 50. The arrangement of the joint 80 and in particular the axial length of the aperture 101 is configured to provide sufficient axial extension during a significant blade 34 impact event for the containment casing 38 to deflect to its desired amount. Thus incorporation of this joint 80 allows the containment casing 38 to be designed to be flexible and lighter than existing designs, without compromising the integrity of the joint 80.

For this embodiment the seal 98 (FIG. 4) is not required and other conventional sealing means may be employed, for instance a silicone based rubber may be disposed between contacting surfaces of the tongue 82 and groove 84 portions.

Figure 6:
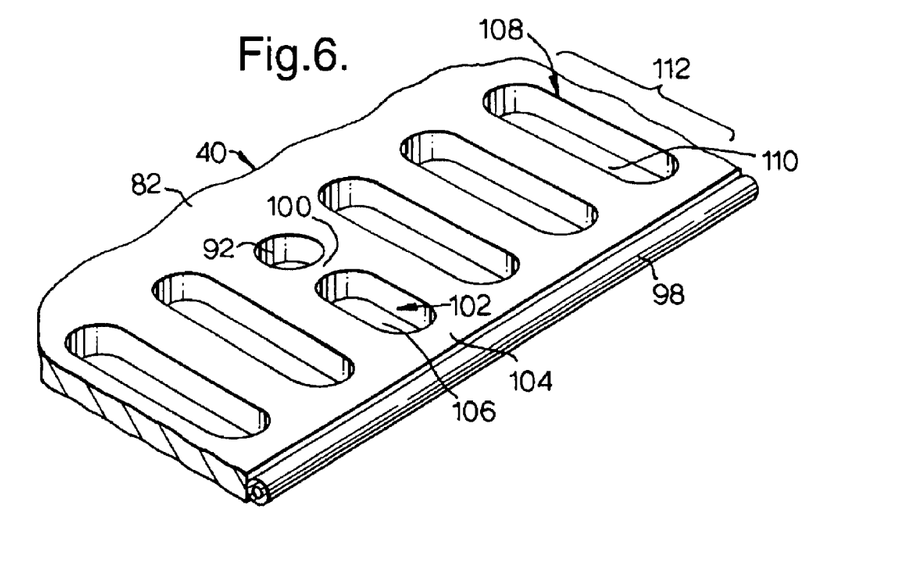
FIG. 6 is an enlarged perspective view of a tongue portion of the present invention in accordance with and as shown in FIG. 4.

Referring to FIG. 6, the tongue portion 82 further comprises an annular array of auxiliary pockets 108 which are generally axially extending and are arranged around the tongue portion 82. A number of the auxiliary pockets 108 are disposed between each pocket 106 and define auxiliary membranes 110. As mentioned hereinbefore when the containment casing 38 is struck by a released blade 34 the casing 38 bulges outward in the area of the impact and in so doing draws the surrounding material toward the impact point. Thus as well as providing an axially extendable joint it is desirable to provide a means to allow the metal casing 40 to circumferentially extend. The arrangement of auxiliary pockets 108 and membranes 110 provide the tongue portion 82 with a flexible circumferential band 112, which is capable of accommodating circumferential draw resulting from a blade 34 impact. Furthermore the auxiliary pockets 110 provide a weight reduction.

Figure 7:
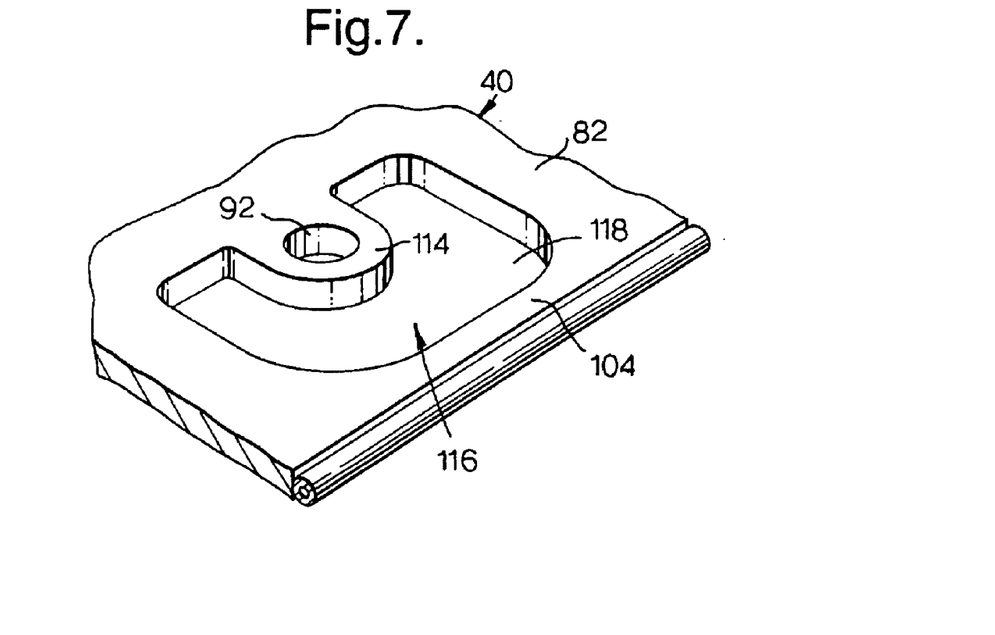
FIG. 7 is an enlarged perspective view of a further embodiment of the tongue portion of the present invention.

FIG. 7 shows a further embodiment of the present invention and comprises an extended pocket 116 defined in the tongue portion 82 and partially surrounding the hole 92 thereby leaving a shear neck 114 and membrane 118. In this embodiment the extended pocket 116 is substantially semi-circular, although the extended pocket 116 may substantially surround the hole 92 or a narrower portion thereof without departing from the object of the present invention. The extended pocket 116 is particularly beneficial in that circumferential draw as well as axial movement of the joint 80 is accommodated in the event of a fan blade 34 off event. The pocket 116 is configured to allow the pin 90 to pull though the membrane 118 in a wide range of axial and circumferential directions. It is intended that this embodiment performs similar to the embodiment described with reference to FIGS. 4 and 5 with the addition that the pin 86 may pull both axially and circumferentially through the membrane 118. This configuration is intended to be used where machining auxiliary pockets 108 is not possible and therefore gives provision for circumferential draw. However, the extended pocket 116 may be used in conjunction with auxiliary pockets 108 as well as the pocket 116 being an orifice.

It is also an advantage of the present invention that the flexible circumferential band 112 provides the tongue portion 82 with a means for thermally expanding radially outward. This can be particularly beneficial where the tongue portion 28 and groove portion 84 are made from different materials and having different thermal expansion co-efficients. As the tongue portion 82 is a complete annular structure, an increase in temperature will result in a radial expansion however, this will be limited by the hoop stress carrying capability of the tongue portion 82. The number, circumferential width and depth of the auxiliary pockets 108 may be therefore be used to provide a more flexible tongue portion 82 which may be matched to the thermal expansion of the groove portion 84.

Figure 8:
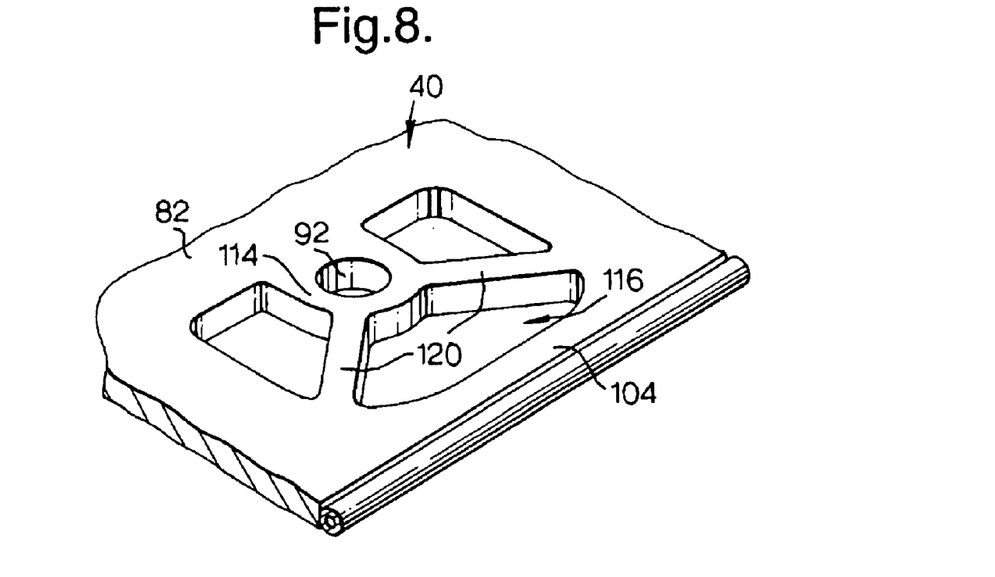
FIG. 8 is an enlarged perspective view of a further embodiment of the tongue portion of the present invention.

In a further embodiment of the present invention and with reference to FIG. 8, the extended pocket 116 is divided by spokes 120 generally disposed in radial alignment from the hole 92. The spokes 120 are employed to prevent the tongue portion 82 and groove portion 84 from excessive movement after the blade 34 impact event has occurred.

Figure 9:
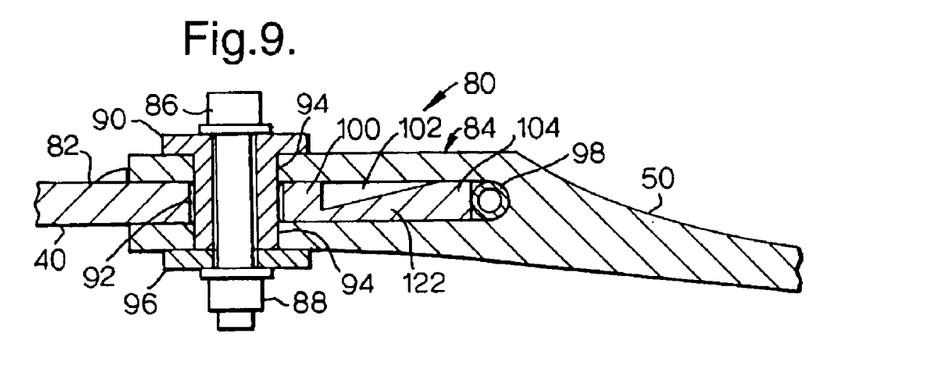
FIG. 9 is an enlarged cross-sectional view of a further embodiment of the portion of the fan blade containment assembly in accordance with the present invention and as shown in FIG. 2.

Referring now to FIG. 9, the various embodiments of the present invention described herein may be further enhanced by the utilisation of a variable thickness membrane 122. In a this embodiment the membrane 122 increases in thickness in the axially downstream direction between the shear neck 102 and the catcher section 104. This embodiment is particularly useful in that the degree of energy absorbed by the membrane 122 increases as the pin 86 is pulled through the tongue portion 82. In this way the membrane 122 is able to distribute an increasing amount of energy to the surrounding tongue portion 82, thereby limiting the degree of axial separation of the joint 80.

Figure 10:
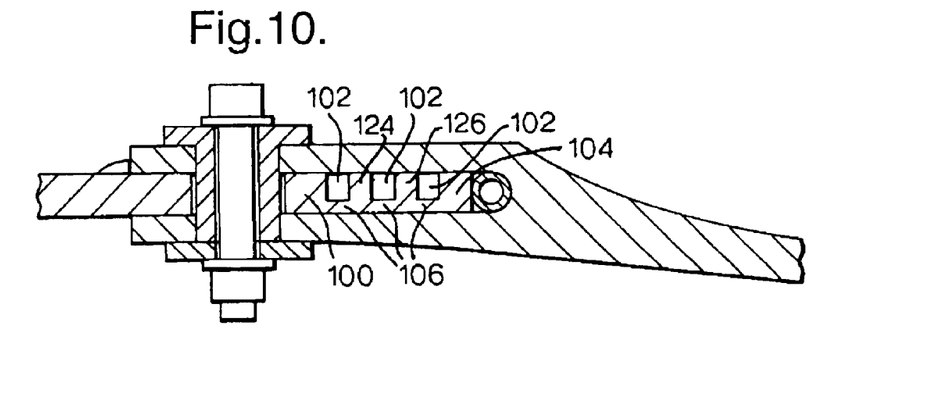
FIG. 10 is an enlarged cross-sectional view of an another arrangement of the portion of the fan blade containment assembly in accordance with the present invention and as shown in FIG. 2.

Referring now to FIG. 10, a series of additional circumferentially extending shear necks 124, 126 and membranes 106 in alternate sequence are provided within the pocket 102. The additional shear necks 124, 126 are intended to control the amount of displacement that the joint 80 undergoes particularly if a blade 34 is released with a lower energy than the worst case impact. Thus during a blade 34 impact event at say 80% of the maximum rotational speed of the engine 10, the pin 86 is pulled through the shear necks 100, 124 and is stopped from further movement at the shear neck 126.

A further advantage of the shear necks 124, 126 is to increase the amount of energy distributed to the surrounding tongue portion 82 and provide step changes in the amount of energy required to fail the shear necks 124, 126 as opposed to the uniform membrane thickness shown in FIG. 4.

It should also be apparent to those skilled in the art that the embodiments of the present invention disclosed herein may be combined to achieve a similar effect as taught herein without departing from the scope of the present invention. For example the additional shear necks 124, 126 may have different radial and or axial thicknesses as well as radial thickness changes. Furthermore the membranes 106 between each additional shear neck 124, 126 may each comprise a variable thickness or may each comprise a different thickness. The addition of the shear necks 124, 126 also increases the amount of material subject to plastic deformation in a given axial length and which yet permits a required axial extension of the joint when the containment casing 38 is subject to a blade 34 impact event.

Figure 11:
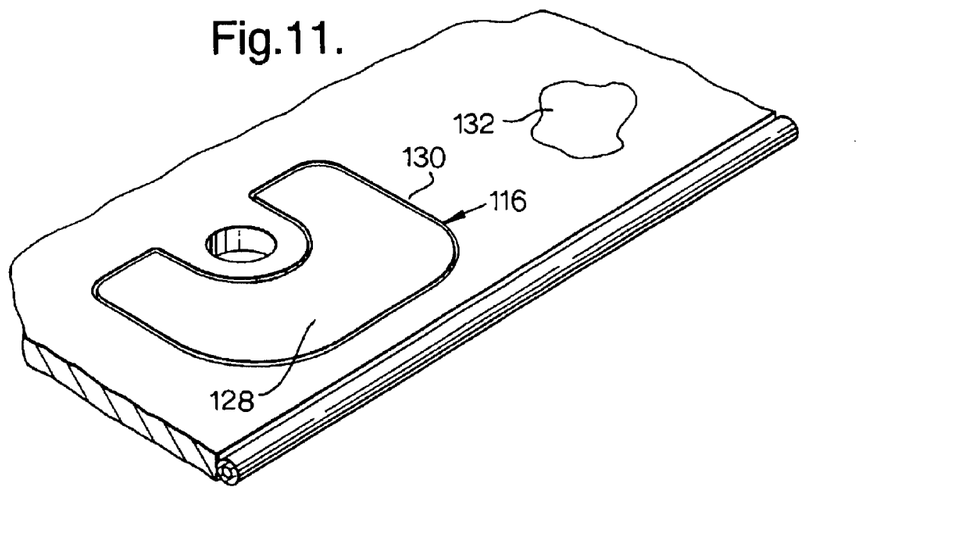
FIG. 11 is an enlarged perspective view of a further embodiment of the tongue portion of the present invention.

In yet another embodiment of the present invention shown in FIG. 11, each pocket 102, 116 may be substantially filled with an insert 128 comprising an energy absorbing material and preferably light weight material. Furthermore, the insert 128 may be disposed to the full depth of the tongue portion 82 with no membrane present. Such an energy absorbing material for the insert 128 is not limited to but may be any one of a group comprising polyurethane, rubber or a honeycomb structure.

It should also be noted that the operation of the joint 80 may be further improved by increasing friction between the tongue portion 82 and the groove portion 84. By increasing friction more impact associated energy may be absorbed by the joint 80. It should therefore be appreciated that contact surfaces (130 on FIG. 10) may comprise a means for enhancing friction be rough or may have a friction enhancing coating applied thereto (132 on FIG. 10). Similarly, the resistance to differential movement between the tongue portion 82 and the groove portion 84 may be increased by increasing the force exerted by the nut 88 and bolt 86. Increasing the force to overcome an increase of frictional contact may be used in conjunction with any of the embodiments described herein. The utilisation of friction resistance may further enhance the reduction of the weight of the joint 80 as the shear neck 100, membranes 106, 118 and catcher portion 104 as well as the bolt 86 may be made less substantial.

Figure 12:
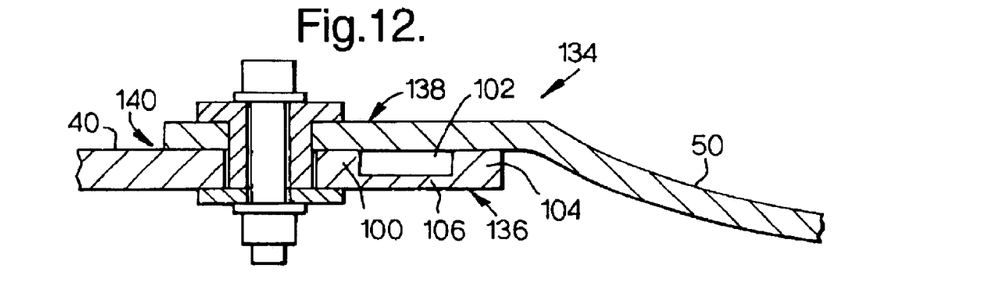
FIG. 12 is an enlarged cross-sectional view of an another arrangement of the portion of the fan blade containment assembly in accordance with the present invention.

Referring to FIG. 12, although the present invention is described with reference to a tongue and groove joint 80, it may also be possible to practise the present invention as hereinbefore described utilising an overlap joint 134. Similar features in this Figure have the same reference numerals and operate in similar manner as to other Figures.

The overlap joint 134 comprises overlapping portions 136 and 138 of respective metal casing 40 and rear fan casing 50. This embodiment is particularly suitable for an annular configuration of the joint 134, for instance in a gas turbine engine 10 fan casing assembly 26, as the annular configuration results in subjecting the joint 134 to tensile loads in the direction substantially parallel to the joint 134.

Figure 13:
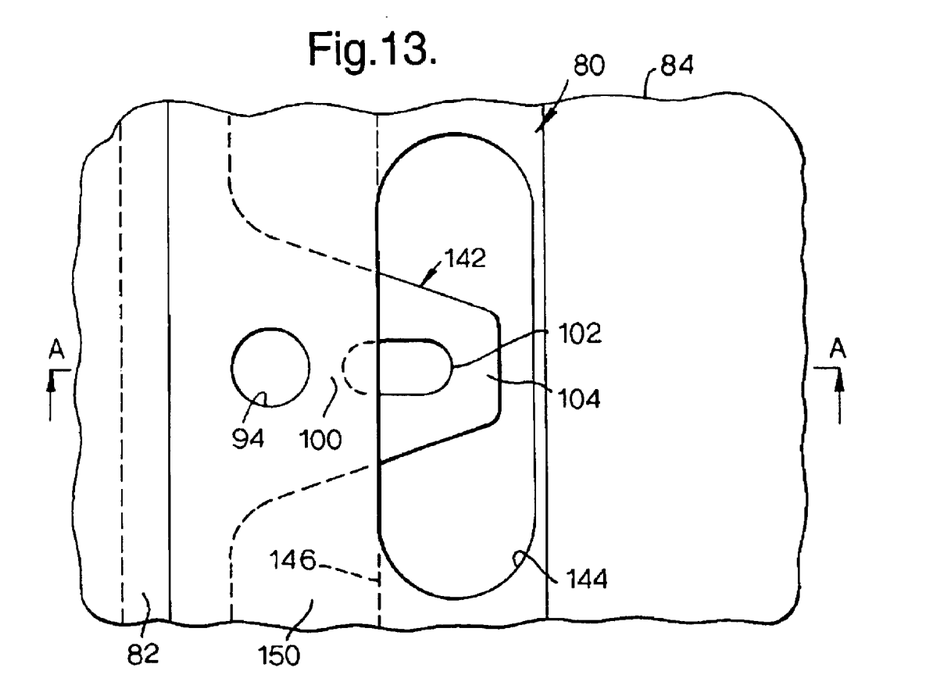
FIG. 13 is top view of a further arrangement of a portion of the fan blade containment assembly in accordance with the present invention.
Figure 14:
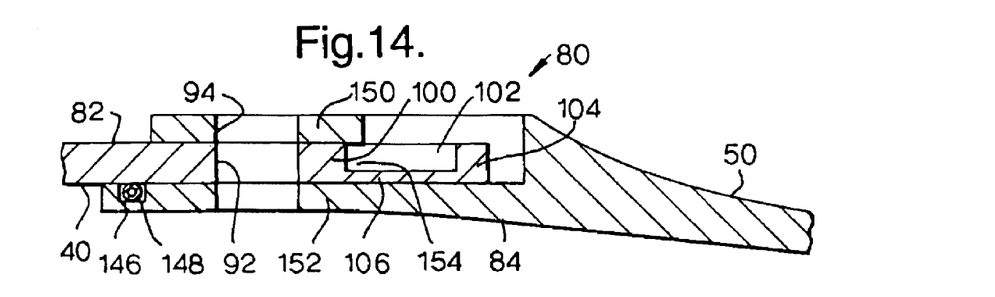
FIG. 14 is an enlarged cross-sectional view A—A of arrangement of the portion of the fan blade containment assembly shown in FIG. 13.

Referring now to FIGS. 13 and 14 where the same numerals have been used for like elements shown in FIG. 4. The securing means (78 in FIG. 4) is omitted for clarity. In this embodiment the tongue portion 82 of the metal casing 40 comprises a plurality of circumferentially spaced apart discrete tongue portions 142. The discrete tongue portions 142 comprise the same general arrangement of hole 92, shear neck 100, pocket 102, membrane 106 and catcher portion 104 and which function in accordance with the present invention. The groove portion 84 comprises radially inner and outer fingers 152 and 150 respectively and which define a groove 154. Axially rearward of the groove 154 the groove portion 84 defines a plurality of circumferentially spaced apart radial slots 144 therein. The radial slots 144 effectively increase the axial length of the groove 154 locally so that, in use, the tongue portion 82 engages the groove 154 and each discrete tongue portion 142 engages a corresponding radial slot 144.

This embodiment is intended to reduce the amount of and the difficulty of machining the groove portion 82 to the depth necessary for the required axial length of the tongue portion 82 (as shown in FIG. 4). During machining of a full length groove 154, the fingers 150, 152 have a tendency to pinch together causing undesirable contact with the cutting tool. Thus a shorter groove 154 provides a reduced amount of contact and improved quality. The groove 156 is now machined axially to the depth shown by the dashed line 146. The radial slot 144 is then machined in the groove portion 84 from a generally radial direction, hence the formation of the groove portion 82 is quicker and more simple. This joint arrangement 80 also provides a weight benefit by virtue of removal of tongue portion 82 material between the discrete tongue portions 142 and radial slot 144 material.

Although the discrete tongue portion 142 is shown generally as a trapezoid, it may be any suitable shape and may extend axially rearward of the slot 144. Although in this embodiment it is preferable for the slot 144 to be defined in the radially outer finger 150, the slot 144 may also be defined in a radially inner finger 152 of the groove portion 84.

An annular O-ring seal 146 is disposed in a recess 148 defined in the radially inner finger 152 of the groove portion 84 and against the tongue portion 82 to prevent fluid leakage through the joint 80.

The metal casing 40 may be manufactured from any suitable metal or metal alloy. Preferably the metal casing 40 comprises a steel alloy, aluminium, an aluminium alloy, magnesium, a magnesium alloy, titanium, a titanium alloy, nickel or a nickel alloy.

Although the invention has been described with reference to a metal casing it may be possible to use the invention on other types of casings.

Although the invention has been described with reference to bolts and nuts fastening the flanges together, other suitable fasteners may be used.

The invention has been described with reference to a fan blade containment assembly, however it is equally applicable to a compressor blade containment assembly and a turbine blade containment assembly.

Although the present invention has been described with reference to a ribbed metal containment casing, it is equally applicable to other types of containment casing, for example a fibrous material wound around a relatively thin metallic casing or a fibrous material wound around a ribbed metal containment casing.

Although an O-ring seal 98 is shown other conventional sealing means may be employed, for instance a silicone based rubber may be disposed between contacting surfaces of the tongue 82 and groove 84 portions.

It should be appreciated to the skilled reader that although the present invention has been described with reference to a casing of a gas turbine engine the present invention is equally applicable to any joining feature which may be subject to a sudden loading. This sudden loading may be an impact load or a shock load. Furthermore the joint arrangement described herein is equally applicable to the automotive industry and to other forms of transport, such as marine or rail, which may be subject to accidental or otherwise impact loads.

It should also be apparent that the joint assembly 80 may have more than one tongue portion 82 and co-operating groove portions 84, the tongue and groove joints 80 being generally axially parallel to one another.

We claim:

1. A joint assembly for use in an annular structure for limiting an extension of the joint in the direction of a load path derived from an impact and where the direction of the impact is generally in a radial direction from an inner area toward an outer area of said structure and comprising:

a first member having a portion and a second member having a portion, the portions overlapping one another and arranged generally parallel to one another and secured together via securing means disposed through corresponding holes defined therein;

wherein one of the overlapping portions further defines, sequentially in the direction of extension, a shear neck located closest to said holes in said first member, a pocket located beyond said shear neck and a catcher portion located at the most remote position relative to said holes in said first member, said shear neck and said pocket so that in the event of a worst case impact load, the securing means shears through the shear neck and the pocket and is then arrested by the catcher portion, thereby the extension of the joint assembly is limited and the joint assembly remains integral.

2. A joint assembly as claimed in claim 1 wherein one overlapping portion is configured as a tongue portion and the other overlapping portion is configured as a groove portion, the tongue portion engages the groove portion in a conventional manner.

3. A joint assembly as claimed in claim 1 wherein the pocket comprises an aperture.

4. A joint assembly as claimed in claim 1 wherein the pocket comprises at least one further shear neck.

5. A joint assembly as claimed in claim 1 wherein contact surfaces comprise a means for enhancing friction.

6. A gas turbine engine rotor blade fan casing assembly wherein said fan casing assembly comprises a joint assembly as claimed in claim 1.

7. A gas turbine engine rotor blade fan casing assembly as claimed in claim 6 wherein the casing is anyone of a group comprising a fan containment casing and a core engine casing.

8. A joint assembly for limiting an extension of the joint in the direction of a load path derived from an impact comprising:
   a first member having a portion and a second member having a portion, the portions overlapping one another and arranged generally parallel to one another and secured together via securing means disposed through corresponding holes defined therein;
   wherein one of the overlapping portions further defines, sequentially in the direction of extension, a shear neck a pocket and a catcher portion; so that in the event of a worst case impact load the securing means shears through the shear neck and the pocket is arrested by the catcher portion, thereby the extension of the joint assembly is limited and the joint assembly remains integral and wherein the pocket comprises a membrane.

9. A joint assembly as claimed in claim 8 wherein the membrane is of a constant thickness.

10. A joint assembly as claimed in claim 8 wherein the membrane is of a variable thickness.

11. A joint assembly as claimed in claim 10 wherein the membrane increases in thickness between the shear neck and the catcher portion.

12. A joint assembly for limiting an extension of the joint in the direction of a load path derived from an impact comprising:
   a first member having a portion and a second member having a portion, the portions overlapping one another and arranged generally parallel to one another and secured together via securing means disposed through corresponding holes defined therein;
   wherein one of the overlapping portions further defines, sequentially in the direction of extension, a shear necks, a pocket and a catcher portion; so that in the event of a worst case impact load the securing means shears through the shear neck and the pocket and is arrested by the catcher portion, thereby the extension of the joint assembly is limited and the joint assembly remains integral and wherein the pocket is substantially semi-circular in configuration about the hole.

13. A joint assembly for limiting an extension of the joint in the direction of a load path derived from an impact comprising:
   a first member having a portion and a second member having a portion, the portions overlapping one another and arranged generally parallel to one another and secured together via securing means disposed through corresponding holes defined therein;
   wherein one of the overlapping portions further defines, sequentially in the direction of extension, a shear neck, a pocket and a catcher portion so that in the event of a worst case impact load, the securing means shears through the shear neck and the pocket and is arrested by the catcher portion, thereby the extension of the joint assembly is limited and the joint assembly remains integral and wherein the pocket is substantially semi-circular in configuration about the hole and wherein the pocket comprises at least one radially aligned spoke.

14. A joint assembly for use in an annular structure for limiting an extension of the joint in the direction of a load path derived from an impact and where the direction of the impact is generally in a radial direction from an inner toward an outer area of said structure and comprising:
   a first member having a portion and a second member having a portion, the portions overlapping one another and arranged generally parallel to one another and secured together via securing means disposed through corresponding holes defined therein;
   wherein one of the overlapping portions further defines, sequentially in the direction of extension, a shear neck located closest to said holes in said first member, a pocket located beyond said shear neck and a catcher portion located at the most remote position relative to said holes in said first member, said shear neck and said pocket so that in the event of a worst case impact load the securing means shears through the shear neck and the pocket and is then arrested by the catcher portion, thereby the extension of the joint assembly is limited and the joint assembly remains integral wherein an energy absorbing insert is disposed to the pocket.

15. A joint assembly for limiting an extension of the joint in the direction of a load path derived from an impact comprising:
   a first member having a portion and a second member having a portion, the portions overlapping one another and arranged generally parallel to one another and secured together via securing means disposed through corresponding holes defined therein;
   wherein one of the overlapping portions further defines, sequentially in the direction of extension, a shear neck a pocket and a catcher portion; so that in the event of a worst case impact load the securing means shears through the shear neck and the pocket is arrested by the catcher portion, thereby the extension of the joint assembly is limited and the joint assembly remains integral and wherein a sealing means is provided to substantially prevent fluid flow through the joint.

16. A joint assembly for limiting an extension of the joint in the direction of a load path derived from an impact comprising:
   a first member having a portion and a second member having a portion, the portions overlapping one another and arranged generally parallel to one another and secured together via securing means disposed through corresponding holes defined therein;
   wherein one of the overlapping portions further defines, sequentially in the direction of extension, a shear neck a pocket and a catcher portion; so that in the event of a worst case impact load the securing means shears through the shear neck and the pocket is arrested by the catcher portion, thereby the extension of the joint assembly is limited and the joint assembly remains integral and wherein one overlapping portion is configured as a tongue portion and the other overlapping portion is configured as a groove portion, the tongue portion engages the groove portion in a conventional manner and wherein the tongue portion comprises a discrete tongue portion and the groove portion comprises a groove and a radial slot, the slot is disposed so that it extends the groove locally and axially rearward, the tongue portion being arranged to engage the groove and the discrete tongue portion being arranged to engage the radial slot.

17. A joint assembly as claimed in claim 16 wherein the tongue portion and groove portion comprise a plurality of corresponding discrete tongue portions and slots.

18. A joint assembly for limiting an extension of the joint in the direction of a load path derived from an impact comprising:

a first member having a portion and a second member having a portion, the portions overlapping one another and arranged generally parallel to one another and secured together via securing means disposed through corresponding holes defined therein;

wherein one of the overlapping portions further defines, sequentially in the direction of extension, a shear neck, a pocket and a catcher portion so that in the event of a worst case impact load the securing means shears through the shear neck and the pocket and is arrested by the catcher portion, thereby the extension of the joint assembly is limited and the joint assembly remains integral and wherein said first member has a tongue portion and said second member has a groove portion and said tongue and groove portions are annular.

19. A gas turbine engine rotor blade fan casing assembly wherein said fan casing assembly comprises a joint assembly for limiting an extension of the joint in the direction of a load path derived from an impact and said joint assembly comprising a first member having a portion and a second member having a portion, the portions overlapping one another and arranged generally parallel to one another and secured together via securing means disposed through corresponding holes defined therein;

wherein one of the overlapping portions further defines, sequentially in the direction of extension, a shear neck, a pocket and a catcher portion so that in the event of a worst case impact load the securing means shears through the shear neck and the pocket and is arrested by the catcher portion, thereby the extension of the joint assembly is limited and the joint assembly remains integral and wherein the fan casing assembly comprises a metal casing and a rear fan casing, the casing assembly comprising the first member and the rear fan casing comprising the second member.

20. A gas turbine engine rotor blade fan casing assembly wherein said fan casing assembly comprises a joint assembly for limiting an extension of the joint in the direction of a load path derived from an impact and said joint assembly comprising a first member having a portion and a second member having a portion, the potions overlapping one another and arranged generally parallel to one another and secured together via securing means disposed through corresponding holes defined therein;

wherein one of the overlapping potions further defines, sequentially in the direction of extension, a shear neck, a pocket and a catcher portion so that in the event of a worst case impact load the securing means shears through the shear neck and the pocket and is arrested by the catcher portion, thereby the extension of the joint assembly is limited and the joint assembly remains integral and wherein said casing assembly includes a containment casing and the impact is derived from a released rotor blade striking the containment casing during operation of the engine.

21. A gas turbine engine rotor blade fan casing assembly wherein said fan casing assembly comprises a joint assembly for limiting an extension of the joint in the direction of a load path derived from an impact and said joint assembly comprising a first member having a portion and a second member having a portion, the portions overlapping one another and arranged generally parallel to one another and secured together via securing means disposed through corresponding holes defined therein;

wherein one of the overlapping portions further defines, sequentially in the direction of extension, a shear neck, a pocket and a catcher portion so that in the event of a worst case impact load the securing means shears through the shear neck and the pocket and is arrested by the catcher portion, thereby the extension of the joint assembly is limited and the joint assembly remains integral and wherein a plurality of joint assemblies is circumferentially disposed about the fan casing assembly.

22. A gas turbine engine rotor blade fan casing assembly wherein a joint assembly is installed for limiting an extension of the joint in the direction of a load path derived from an impact comprising:

a first member having a portion and a second member having a portion, the portions overlapping one another and arranged generally parallel to one another and secured together via securing means disposed through corresponding holes defined therein;

wherein one of the overlapping portions further defines, sequentially in the direction of extension, a shear neck a pocket and a catcher portion; so that in the event of a worst case impact load the securing means shears through the shear neck and the pocket is arrested by the catcher portion, thereby the extension of the joint assembly is limited and the joint assembly remains integral and wherein said fan casing assembly comprises said joint assembly and wherein at least one additional pocket is disposed between each joint assembly.

* * * * *